(12) United States Patent
Prasky et al.

(10) Patent No.: US 7,676,663 B2
(45) Date of Patent: Mar. 9, 2010

(54) METHOD, SYSTEM AND PROGRAM PRODUCT FOR PIPELINED PROCESSOR HAVING A BRANCH TARGET BUFFER (BTB) TABLE WITH A RECENT ENTRY QUEUE IN PARALLEL WITH THE BTB TABLE

(75) Inventors: Brian Robert Prasky, Wappingers Falls, NY (US); Thomas Roberts Puzak, Ridgefield, CT (US); Allan Mark Hartstein, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/796,426

(22) Filed: Mar. 9, 2004

(65) Prior Publication Data

US 2005/0204120 A1 Sep. 15, 2005

(51) Int. Cl.
*G06F 15/00* (2006.01)
*G06F 7/38* (2006.01)
*G06F 9/00* (2006.01)
*G06F 9/44* (2006.01)

(52) U.S. Cl. .................... 712/238; 712/241; 712/240
(58) Field of Classification Search ............ 712/238, 712/241, 240
See application file for complete search history.

(56) References Cited

U.S. PATENT DOCUMENTS

| 5,434,985 | A * | 7/1995 | Emma et al. ............ 712/240 |
| 6,263,427 | B1 * | 7/2001 | Cummins et al. ........ 712/236 |
| 6,425,075 | B1 * | 7/2002 | Stiles et al. .............. 712/239 |
| 2004/0139281 | A1 * | 7/2004 | McDonald ............... 711/133 |

* cited by examiner

*Primary Examiner*—Eddie P Chan
*Assistant Examiner*—George D Giroux
(74) *Attorney, Agent, or Firm*—John E. Campbell; Graham S. Jones

(57) ABSTRACT

A method and apparatus enable supplementing a Branch Target Buffer (BTB) table with a recent entry queue that prevents unnecessary removal of valuable BTB table data of multiple entries for another entry. The recent entry queue detects when the startup latency of the BTB table prevents it from asynchronously aiding the microprocessor pipeline as designed for and thereby can delay the pipeline in the required situations such that the BTB table latency on startup can be overcome. The recent entry queue provides a quick access to BTB table entries that are accessed in a tight loop pattern where the throughput of the standalone BTB table cannot track the throughput of the microprocessor execution pipeline. By using the recent entry queue, the modified BTB table processes information at the rate of the execution pipeline which provides acceleration thereof.

30 Claims, 7 Drawing Sheets

METHOD, SYSTEM AND PROGRAM PRODUCT FOR PIPELINED PROCESSOR HAVING A BRANCH TARGET BUFFER (BTB) TABLE WITH A RECENT ENTRY QUEUE IN PARALLEL WITH THE BTB TABLE

FIELD OF THE INVENTION

This invention relates to computer processing systems, and particularly controls entry insertion into a Branch Target Buffer (BTB) table via a queue structure which also serves the purpose of creating synchronization between asynchronous branch prediction and instruction decoding to overcome start-up latency effects in a computer processing system.

BACKGROUND

A basic pipeline microarchitecture of a microprocessor processes one instruction at a time. The basic dataflow for an instruction follows the steps of: instruction fetch, decode, address computation, data read, execute, and write back. Each stage within a pipeline or pipe occurs in order; and hence a given stage can not progress unless the stage in front of it is progressing. In order to achieve highest performance for the given base, one instruction will enter the pipeline every cycle. Whenever the pipeline has to be delayed or cleared, this adds latency which in turn can be monitored by evaluating the performance of a microprocessor carrying out a task. While there are many complexities that can be added on to such a pipe design, this sets the groundwork for branch prediction theory related to the present invention.

There are many dependencies between instructions which prevent the optimal case of a new instruction from entering the pipe every cycle. These dependencies add latency to the pipe. One category of latency contribution deals with branches. When a branch is decoded, it can either be "taken" or "not taken." A branch is an instruction which can either fall through to the next sequential instruction, that is "not taken," or branch off to another instruction address, that is, "taken," and carries out execution on a different sequence of code.

At decode time, the branch is detected, and must wait to be resolved in order to know the proper direction in which the instruction stream is to proceed. By waiting for potentially multiple pipeline stages for the branch to resolve the direction in which to proceed, latency is added into the pipeline. To overcome the latency of waiting for the branch to resolve, the direction of the branch can be predicted such that the pipe begins decoding either down the "taken" or "not taken" path. At branch resolution time, the guessed direction is compared to the actual direction the branch was to take. If the actual direction and the guessed direction are the same, then the latency of waiting for the branch to resolve has been removed from the pipeline in this scenario. If the actual and predicted direction miscompare, then decoding has proceeded down the improper path and all instructions in this improper path behind that of the improperly guessed direction of the branch must be flushed out of the pipe. Then the pipe must be restarted at the correct instruction address to begin decoding the actual path the given branch is supposed to take.

Because of controls involved with flushing the pipe and beginning over, there is a penalty associated with the improper guess and latency is added into the pipe over simply waiting for the branch to resolve the issue of the correct path before decoding further. By having a proportionally higher rate of correctly guessed paths, the ability to remove latency from the pipe by guessing the correct direction outweighs the latency added to the pipe for guessing the direction incorrectly.

In order to improve the accuracy of a guess for a branch, a Branch History Table (BHT) can be implemented which allows for direction guessing of a branch based on the past behavior of the direction the branch previously went. If the branch is always taken, as is the case of a subroutine return, then the branch will always be guessed as taken. IF/THEN/ELSE structures are more complex in their behavior. A branch may be always taken, sometimes taken and not taken, or always not taken. Based on the implementation of a dynamic branch predictor, this will determine how well the BHT table predicts the direction of the branch.

When a branch is guessed taken, the target of the branch is to be decoded. The target of the branch is acquired by making a fetch request to the instruction cache for the address which is the target of the given branch. Making the fetch request out to the cache involves minimal latency if the target address is found in the first level of cache. If there is not a hit in the first level of cache, then the fetch continues through the memory and storage hierarchy of the machine until the instruction text for the target of the branch is acquired. Therefore, any given taken branch detected at decoding has a minimal latency associated with it that is added to the amount of time it takes the pipeline to process the given instruction. Upon missing a fetch request in the first level of memory hierarchy, the latency penalty the pipeline pays grows higher and higher, the farther up in the hierarchy the fetch request must progress, until a hit occurs. In order to hide part or all of the latency associated with the fetching of a branch target, a BTB table can work in parallel with a BHT table.

Given a current address which is currently being decoded from an input, the BTB table can search for the next instruction address from this point forward which contains a branch. Along with storing the instruction address of branches in the BTB table, the target of the branch is also stored with each entry. With the target being stored, the address of the target can be fetched before the branch is ever decoded. By fetching the target address ahead of decoding latencies associated with cache misses can be minimized to the point of time it takes between the fetch request and the decoding of the target of the branch.

In designing a BTB table, the number of branches that can be stored therein is part of the equation that determines how beneficial the structure is. In general, a BTB table is indexed by part of an instruction address within the processor, and tag bits are stored in the BTB table such that the tag bits must match the remaining address bits of concern that were not used for the indexing. In order to improve the efficiency of the BTB table, it can be created such that it has an associativity greater than one. By creating an associativity greater than one, multiple branch/target pairs can be stored for a given index into the array. To determine which is the correct entry, if an entry at all, the tag bits are used to select one entry, at most, from the multiple entries stored for a given index.

When a branch is determined at decoding time and it was not found ahead of time by the asynchronous BTB/BHT table function, the branch is determined as a surprise branch. A surprise branch is any branch which was not found by the dynamic branch prediction logic ahead of the time of decoding. A branch is not predicted by the branch prediction logic because it was not found in the BTB/BHT tables. There are two reasons that a branch is not found in the BTB/BHT tables. If a branch is not installed in the BTB/BHT tables, then a branch can not be found, as it is nowhere to be found. The second scenario is a situation in which the branch resides in the BTB/BHT tables. However, not enough processing time has been available so that searching could find the branch prior to decoding thereof. In general, branch prediction search algorithms can have a high throughput. However, the latency required for starting a search can be a reasonable length longer compared to the starting of instructions down the pipeline in respect to the time frame that an instruction decodes.

Whenever a branch is detected at decoding time, where the branch is a surprise branch, upon knowing the target and direction of the branch at a later time, an entry can be written into the BTB and the BHT tables. Upon writing the entry into the tables, the entry can ideally be found the next time a search is in the area in the machine of the stated branch.

In the case in which a branch resides in the BTB/BHT tables but latency effects prevent the branch from being found in time, the branch is treated like a surprise branch as this branch is no different from a branch which is not in the tables. Upon determining the target and direction of the branch, it will be written into the BTB/BHT tables. A standard method of entering a branch into the tables is to place it in the given column (associativity) that was least recently used; thereby, keeping those branches which were most recently accessed in the tables. A reading of the columns prior to the write is not performed to check for duplicates because the number of reads that would have to be performed in addition to the normal operation would be enough to cause additional latency delays which would further hinder branches from being found so they could be predicted. Hence, this would increase the quantity of surprise branches in a series of code. Increasing the number of surprise branches causes the performance to decrease. In order to work around the raised latency issues, a recent entry has been designed to keep track of the recent entries into the BTB table. Through the process of this queue, additional reads from the BTB table are not required. Furthermore, the size of such a queue over a duplicate array or another read port on the given array is magnitudes different in size. The space for a second full size array or an additional read port can be deemed to be so great that the area of the machine spent for such an operation can be better spent elsewhere for higher performance gains. By adding a small recent entry queue, the area of the machine is kept modest while the performance delta between a queue and additional read port is minimal, if not for the better.

One problem encountered with the BTB table in the case of multiple instantiations of a branch entry is that the multiple instantiations of the branch entry can be written into a BTB table at a high frequency based on code looping patterns. However, this hinders the BTB table performance by removing valid entries for duplicate entries of another branch. Thus, a clear need exists for a way in which to prevent multiple instantiations of a branch entry within the BTB table.

SUMMARY OF THE INVENTION

The shortcomings of the prior art are overcome and additional advantages are provided through the provision of a recent entry queue that tracks the most recent branch/target data that is stored into a BTB table. Through the usage of a BTB table recent entry queue, any new entry that is to be written into the BTB table is first checked against that of the recent entry queue. If the contained data that is to be written into the BTB table is valid in the recent entry queue, then the data is already contained in the BTB table. Given the fact that the data is already in the BTB table, the data write into the BTB table for the given entry is blocked. If the data was not blocked, then it would most likely replace other valid data when a BTB table has an associativity greater than one.

As noted above, in pipeline processors of the prior art, multiple instantiations of a branch entry could be written into a Branch Target Buffer (BTB) table at a high frequency based on code looping patterns. This reduces performance by removing valid instances for duplicate entries of another branch. This had the effect of causing the BTB table to behave as a single associative design given any amount of designed associativity.

According to the method, system, and program product described herein, by keeping track of closely associated duplicates to become entries, the monitoring structure is extended not only to block BTB table writes, but additionally to notify instruction decode when such an operation is to take place. In the case of the majority of duplicate entries, the occurrence is initiated by an instruction loop where the first branch was not predicted in time because of branch prediction start-up latency which thereby causes each additional iteration not to be predicted in time. By being able to predict one iteration of the loop, the BTB table is able to get ahead and therefore potentially to predict all future iterations of the branch point. By causing a delay in the pipeline by blocking the decoding operation, the branch prediction logic is able to get ahead thereby allowing the pipeline to run at the efficiency of which it is capable. Such operations are viewable by higher performance which can be viewed externally as an application completing a task in a shorter time span.

Beyond blocking repetitive data blocks from being written into the BTB table, the recent entry queue also serves the purposes of being able to delay decoding and to perform an accelerated lookup. Whenever a branch is repeatedly taken and each iteration is not predicted by the BTB table, the recent entry queue provides the data necessary to detect this such that decoding can be delayed, thereby allowing the branch prediction logic to catch up to the decoding pipeline of the machine.

Finally, because the queue is a very small structure, it has a minimal latency compared to the time it takes to look up an entry in the array. Therefore, branch detection via the branch prediction logic can occur in fewer time/cycles when using the recent write entry queue over the BTB table. Given such a pattern, particular tight loop prediction scenarios that hinder the BTB table can be overcome via the recent entry queue thereby making these loops predictable. Predicting such loops successfully removes latency from the pipeline thereby improving the overall performance of a machine. These performance improvements are evidenced by the reduced amount of time that is required for a computer program to complete the task at hand.

The method of operating a computer, the program product for operating a computer, and the computer having a pipelined processor with a BTB table in accordance with this invention achieves these ends by creating a recent entry queue in parallel with the BTB table. The recent entry queue comprises a set of BTB table entries, which are organized as a FIFO queue, and preferably a FIFO queue that is fully associative for reading.

In carrying out the method of this invention, an entry to be written into the BTB table is compared against the valid entries within the recent entry queue, an entry matching an entry within the recent entry queue is blocked from being written into the BTB table. When an entry is written into the BTB table it is also written into the recent entry queue.

A further step involves searching the BTB table for a next predicted branch and evaluating the recent entry queue while the BTB table is being indexed. The recent entry queue maintains a depth up to the associativity of the BTB table, whereby while the BTB table is indexed, the recent entry queue positions are input into comparison logic. The recent entry queue depth is searched in respect to a matching branch in parallel with searching the BTB table output, whereby the hit detect logic supports the associativity of the BTB table. In searching the BTB table for the next predicted branch, the search strategy uses a subset of the recent entry queue as a subset of the BTB table, and preferably fast indexes recently encountered branches. A further aspect of this invention includes searching the complete recent entry queue to block duplicate BTB table writes.

Still another aspect of the invention comprises searching the recent entry queue to detect looping branches. This may be done by comparing the branch to determine if it was recently written into the queue. A further operation includes determining if the branch is backwards branching, whereby a looping branch is detected. This includes first detecting a looping branch that is not predicted, and thereafter delaying a decoding step. The decoding step is delayed until a fixed number of cycles, or until the BTB table predicts a branch.

A further aspect of the described method, system, and program product of this invention comprises staging writes to the BTB table in the recent entry queue, including delaying a write and placing the write in the recent event queue, and also detecting a predicted branch while its BTB table write is temporarily staged in the recent entry queue.

System and computer program products corresponding to the above-summarized methods are also described and claimed herein. Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Various objects, features, and advantages of the invention are described in the following detailed description taken in conjunction with the accompanying drawings in which.

DETAILED DESCRIPTION OF THE INVENTION

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings.

Figure 1:
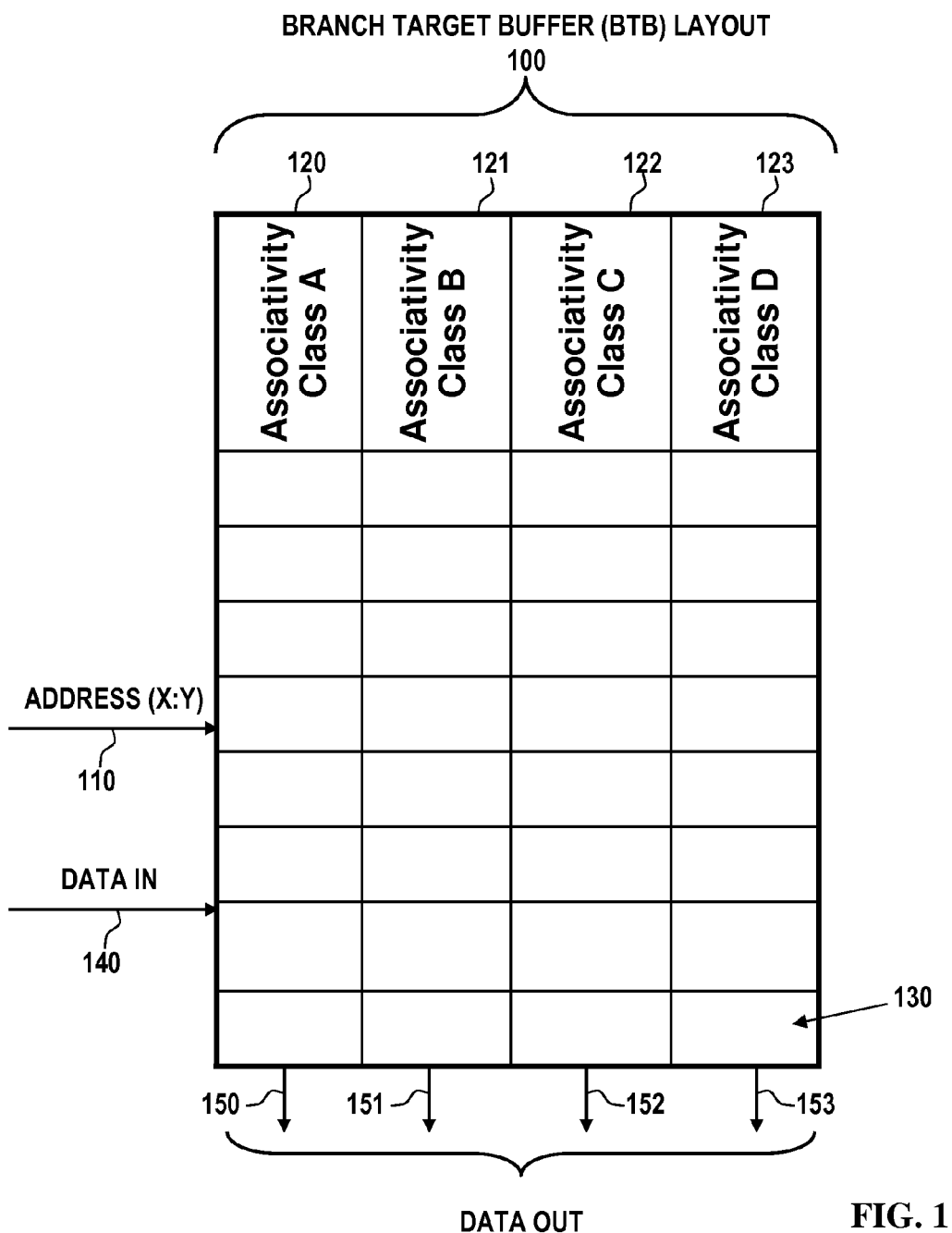
FIG. 1 illustrates one example of a Branch Target Buffer (BTB) table layout.
Figure 4:
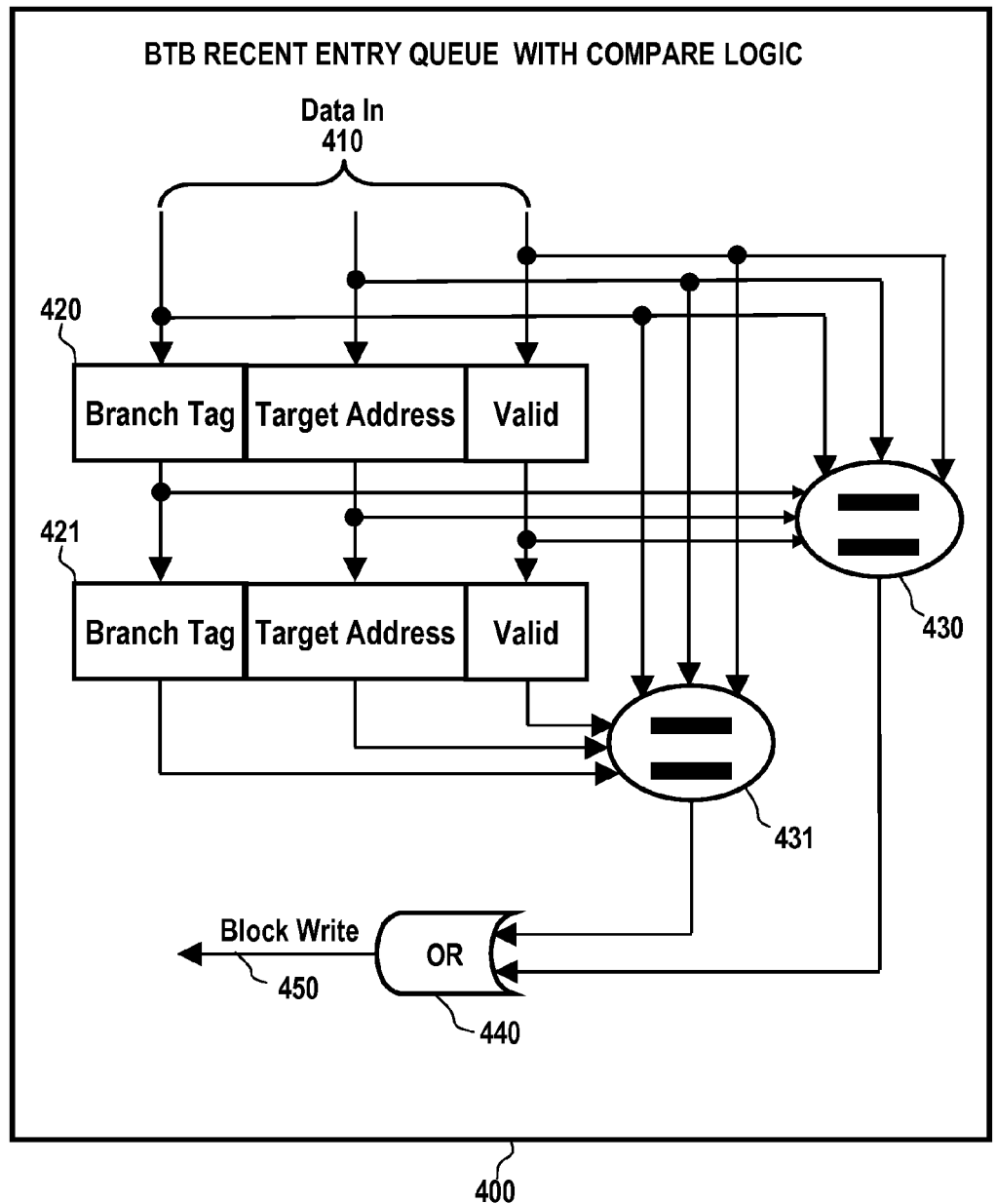
FIG. 4 illustrates one example of a BTB table recent entry queue with compare logic.

The present invention is directed to a method and apparatus for implementing a recent entry queue which complements a Branch Target Buffer (BTB) 100 as shown generally in FIG. 1. Through the usage of a BTB recent entry queue 400, as shown in FIG. 4, three benefits are acquired as follows:

1) Removal of majority of scenarios that can cause duplicate entries in the BTB.

2) The ability to semi-synchronize the asynchronous interface between branch prediction and decode when the latency of the branch detection via the BTB table initially places the BTB behind the decode of a pipeline when the pipeline is starting up from a cold start or after a branch wrong.

Figure 3:
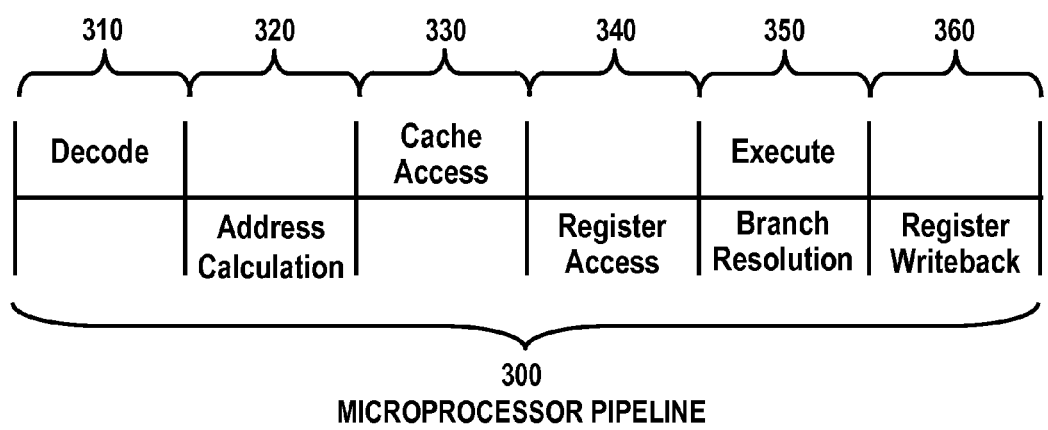
FIG. 3 illustrates one example of a microprocessor pipeline.

3) For frequently accessed branches, the ability to access them in fewer cycles thereby improving the throughput of the branch prediction logic which in turn improves the overall throughput of the given microprocessor pipeline 300 of FIG. 3, with decode 310, address calculation 320, cache access 330, register access 340, execute and branch resolution 350, and register writeback 360.

Figure 2:
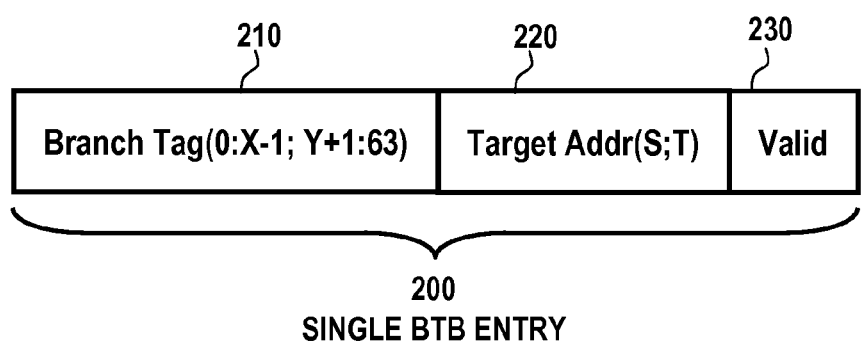
FIG. 2 illustrates one example of data contained within a single entry of a BTB table and recent entry queue.

As illustrated generally in FIG. 1, a Branch Target Buffer (BTB) layout of a BTB table 100 is an array relating to the branch prediction logic within a microprocessor. The BTB table 100 is responsible for the target prediction of a predicted taken branch. Given a 64 bit machine, per example, the multi-associative BTB table 100 with associativity classes in columns A 120, B 121, C 122, and D 123 is fed some search address 110 of stated bits for a given range x:y where x>0, x<y, and y<63. This address is used to index a given row of the BTB table 100. For the given row, data is read out to corresponding data output lines 150, 151, 152, 153 from each of the corresponding associativity classes in columns A 120, B 121, C 122, and D 123 of the BTB table 100. What is contained within each entry such as entry 130, in FIG. 1 is shown in more detail, as an entry 200 in FIG. 2 of the BTB table 100, where there are three main pieces of data comprising: a branch tag 210, a target address 220, and a valid bit 230. The branch tag 210 is separated into two pieces, a high order range and a low order range. The high order range is used to compare with the high order search address bits. When there is a match, then the given entry has the potential of being a predicted branch. Besides the entry being valid, the low order range of the branch tag, y+1:63 must occur at or after the search address, as the goal is to find a predicted branch at or after the search address that is sent to the BTB table. Upon finding a match for a given entry, it is possible that there are multiple matches in each of the associativity classes. Once again, the low order address bits are used to determine which associativity class in columns 120, 121, 122, 123 in FIG. 1 comes first, while being at or after the initial search address 110. FIG. 3 illustrates one example of a microprocessor pipeline 300. When a match is found, the information is passed onto the main pipeline of the microprocessor where it will compare the predicted branch address to the address of the instruction(s) that are in the decoding stage 310 of the microprocessor pipeline of FIG. 3. When a match between the two addresses is acquired, then the instruction decoding stage 310 is a predicted taken branch. In parallel upon the branch being found by the BTB table 100, a fetch request is placed in progress for the target address. Ideally the fetch request will have returned from the instruction cache by the time the branch has decoded. Given the stated scenario, the target will be able to decode the cycle cache address stage 320 upon which the target of the branch is being computed; as the target has already been acquired via the cache. Had the branch not been predicted by the BTB table, a fetch request for the target would not have been able to have been made to the cache until the branch had decoded and the target was computed by the cycle cache address stage 320. Hence the prediction of the branch and the target has removed latency from the pipeline of the microprocessor.

Figure 5:
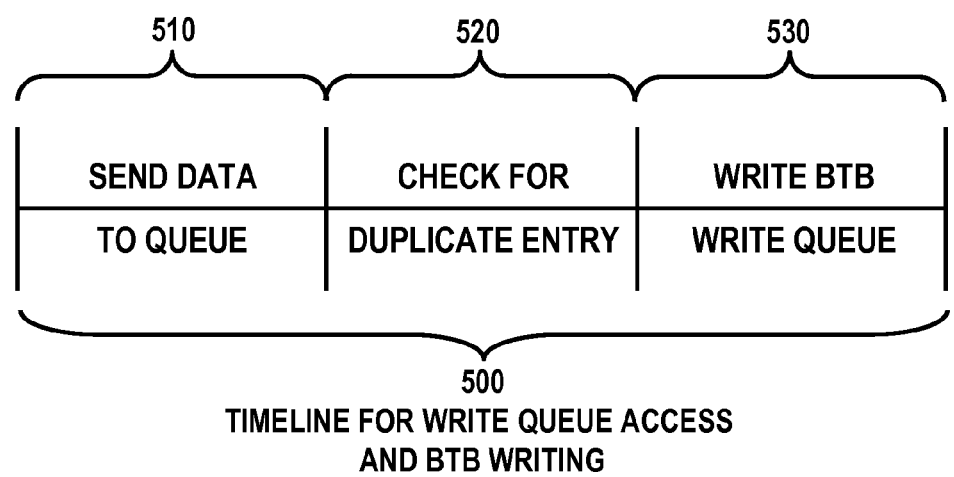
FIG. 5 illustrates one example of a timeline for write queue access and BTB table writing.
Figure 6:
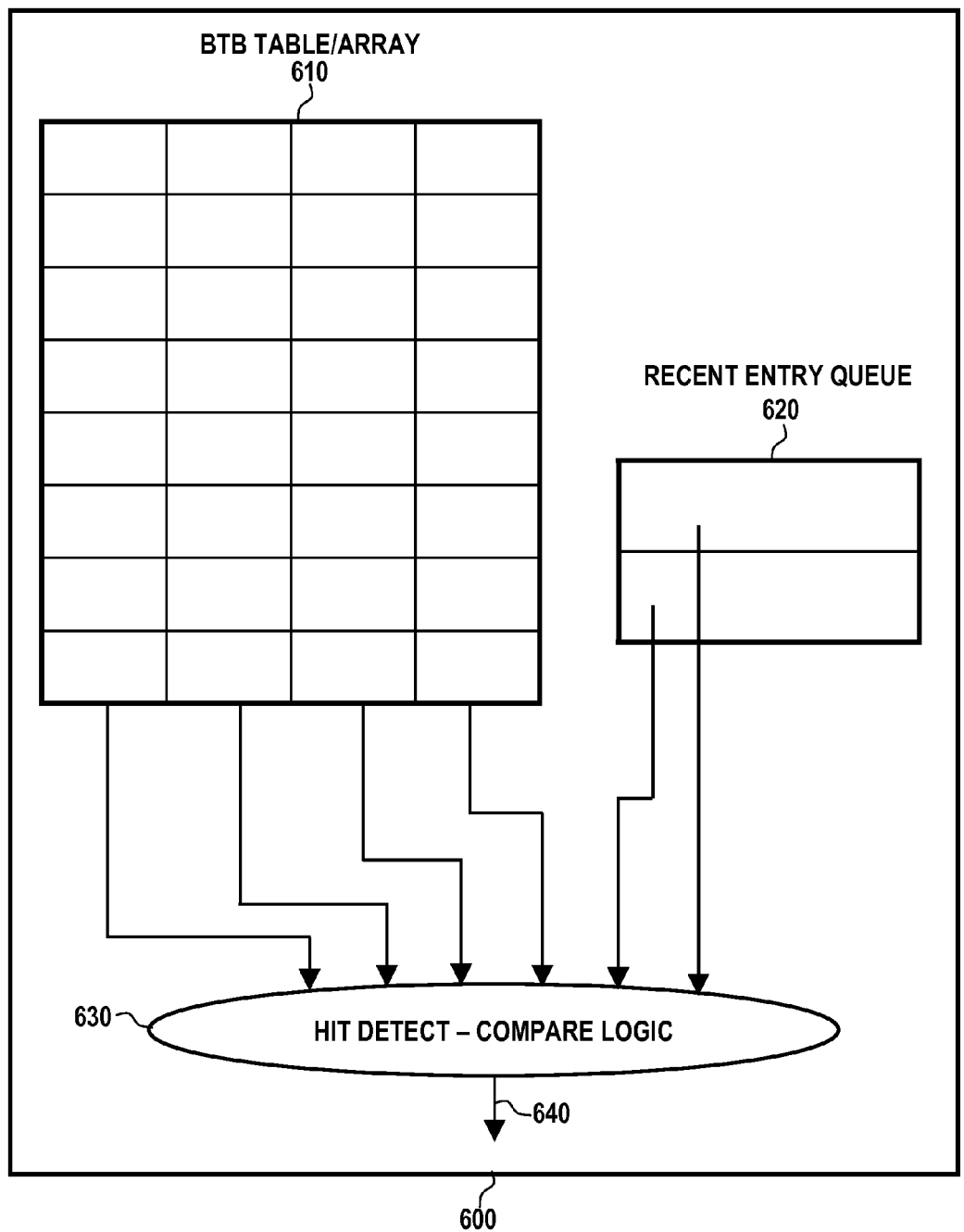
FIG. 6 illustrates one example of a recent entry queue modifying the BTB table hit detect logic.

When a branch is not predicted, a surprise branch 710, (FIG. 7) may be encountered, and it is to be written into the BTB 100 in FIG. 1, and 610 in FIG. 6 such that it can be predicted in respect to the next occurrence, upon resolution 350 of branch at the execute time frame that the target of the branch and the direction of the branch resolution are known. It has been standard to use the known information at this time frame, per example, and write the branch into the BTB 610. A branch can be a surprise branch 710 for one of two reasons: it was not in the queue, or it was in the queue but it was not found in time. In the latter case, the branch should not ideally be added into the BTB 610 again, as doing so would most likely replace some other good entry which is different from the duplicate entry that is to be written in to the BTB 610. Through the usage 500 in FIG. 5 of a recent entry queue 400, 620 in FIG. 6, whenever a in entry 140 in FIG. 1 is to be written 510 into the BTB 610, it is first compared 430, 431, 720 to the entries 420, 421 within the recent entry queue. If it matches 440 520 one of the entries in the recent entry queue 620 then the entry 140, 410 is blocked 450 from being written into the BTB 610 as it already exists somewhere within the BTB 610. If the entry is not located within the recent entry queue 420, 421, 620 then the entry is written 530 into both the BTB 610 and the recent entry queue 620. The recent entry queue works in a first in 410, 420—first out 421 (FIFO) queue structure. When a new entry is placed into the queue, the oldest entry in the queue is moved out to make room for the newest entry. Should an entry in the BTB 610 be required to be invalidated for any reason, the recent entry queue 420, 421 must be checked to determine if the entry is also contained within it. If the entry is in the recent entry queue 420, 421 and the entry is being invalidated in the BTB 610, then the entry must also be invalidated in the recent entry queue 420, 421.

FIG. 6 illustrates an example of a recent entry queue 620 modifying the the BTB status 610. Since the recent entry queue 620 is a substantially smaller subset of the BTB 610, the ability to search for branch/target pairs in the recent entry queue 620 is significantly faster than searching in the BTB 610. In the cycle the BTB 610 is being accessed for a given row based on the search index, the recent entry queue 620 can be compared to the hit detect criteria 630 in parallel. Hence, whenever a new search is started, during the cycle a read is being performed from the BTB table 610, the recent entry queue 620 is doing a compare 630 on its contents during the same cycle. The ability to do a hit detect 640, or search match, a cycle earlier improves the latency factor of the branch prediction logic for tight looping branches where the same branch is accessed repetitively and the BTB table 610 by itself is unable to keep up because of the initial time required to access the BTB array 610.

Figure 7:
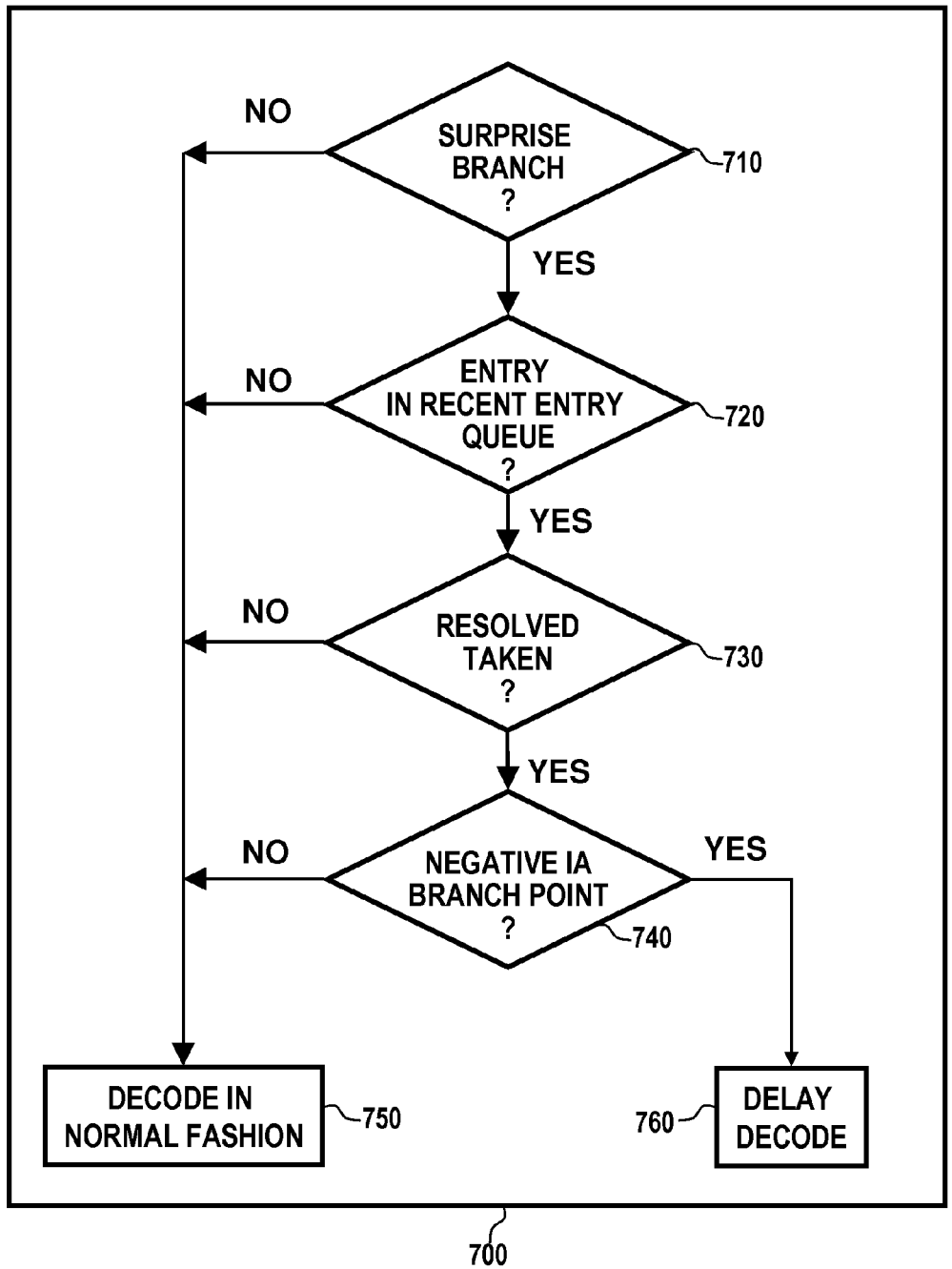
FIG. 7 illustrates one example of a state machine descriptor of a recent entry queue delaying decoding.

In FIG. 7 block 700 illustrates an example of a state machine description of a recent entry queue delaying decode. As shown, because the BTB 610 is working asynchronously from the decoding 310 of instructions in the microprocessor pipeline 300 of FIG. 3, it is possible for the pipeline to decode 310, a branch which is predictable, but was not yet found by the BTB 610. In such cases, the branch is deemed as a surprise branch 710 and resolution 350, the execution cycle, of the branch, it will once again be placed into the BTB 610. In the cases where this missed branch is a loop branch it will continue not to be predicted for after each occurrence of not finding it, the branch prediction logic will restart based on the surprise branch 710. In the case that the branch is already in the BTB 610 as detected 440 by the recent entry queue 620, recent entry queue 720, and the branch is a taken branch 730 where the branch repeatedly occurs with a negative offset 740, the recent entry queue 620 can be used to detect this scenario and cause the decoding 310 after the branch to be delayed 760 until the first prediction via the BTB 610 is made such that the predicted branch address can be compared against all future decodes 610. By causing a delay 760 in the decode of the pipeline 300, the next iteration of the branch will be predicted by the BTB 610 in time. Given that a BTB 610 can have higher latency on start-up compared to the latency thereof once it is running, the one time delay of 750, or 760 of decode can be enough to allow the branch to be predicted for all future iterations of the current looping pattern.

The capabilities of the present invention can be implemented in software, firmware, hardware or some combination thereof.

As one example, one or more aspects of the present invention can be included in an article of manufacture (e.g., one or more computer program products) having, for instance, a computer usable media having computer readable code thereon for controlling and configuring a computer machine having a pipelined processor and a branch target buffer (BTB) creating a recent entry queue in parallel with the branch target buffer (BTB). The computer usable media has embodied therein, for instance, computer readable program code means for providing and facilitating the capabilities of: the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of operating a computer having a pipelined processor having a Branch Target Buffer (BTB) table comprising:

creating a recent entry queue comprising a small subset of entries in said BTB table logically positioned in parallel with said BTB table;

organizing said recent entry queue as a First In First Out (FIFO) queue wherein when a previously presented entry is placed into said recent entry queue, an oldest entry therein is moved out to make room for said previously presented entry;

organizing said BTB table with a plurality of multi-associative classes with said recent entry queue being associative;

defining said recent entry queue logically as a subset of said BTB table and coupled to track a last number of branches entered into said BTB table;

comparing each previously presented entry to most recent entries in said recent entry queue; and blocking duplicate entries from being installed into said BTB table and said recent entry queue by examining contents of said recent entry queue for duplicate entries prior to a write into said BTB table and into said recent entry queue; and in addition allowing decoding to be delayed by a defined number of cycles such that a branch of interest can be delayed from decoding in order to allow a given entry in said BTB table to be detected in time for future decoding of said branch of interest.

2. The method of claim 1 comprising searching said BTB table for a next predicted branch and evaluating said recent entry queue while said BTB table is being indexed.

3. The method of claim 2 wherein:
said recent entry queue maintains a depth up to the associativity of said BTB table;
whereby while said BTB table is indexed, said recent entry queue positions are input to comparison logic.

4. The method of claim 2 comprising searching said recent entry queue for a matching branch in parallel to searching BTB table output.

5. The method of claim 4 comprising creating hit detect logic to support the associativity of said BTB table.

6. The method of claim 2 comprising using a subset of the recent entry queue as a subset of said BTB table.

7. The method of claim 6 comprising fast indexing of recently encountered branches.

8. The method of claim 6 comprising:
providing a complete recent entry queue; and
searching said complete recent entry queue to block duplicate BTB table writes.

9. The method of claim 1 comprising staging writes to said BTB table in said recent entry queue.

10. The method of claim 9 comprising delaying a write and placing said write in said recent event queue.

11. The method of claim 10 comprising detecting a predicted branch while a BTB write is temporarily staged in said recent entry queue.

12. The method of claim 1 wherein said recent entry queue is fully associative for reading.

13. The method of claim 1 comprising delaying decoding until after a fixed number of cycles.

14. The method of claim 1 comprising delaying decoding until said BTB table predicts a branch.

15. A hardware computer system having a pipelined processor, comprising:
a comparator for comparing a Branch Target Buffer (BTB) table with a recent entry queue with said recent entry queue comprising a set of BTB table entries logically positioned in parallel with said BTB table;
said computer organizing said recent entry queue as a FIFO queue wherein when a previously presented entry is placed into said recent entry queue, an oldest entry therein is moved out to make room for said previously presented entry;
said BTB table being organized into multi-associative classes and said recent entry queue being associative;
said recent entry queue being logically defined as a subset of entries in said BTB table and coupled to track a last number of branches entered into said BTB table;
comparing each previously presented entry to most recent entries into said recent entry queue; and
said recent entry queue blocking duplicate entries from being installed into said BTB table and into said recent entry queue by examining the contents of said recent entry queue for duplicate entries prior to a write into said BTB table and said recent entry queue and in addition allowing a decode to be delayed by a defined number of clock cycles such that a branch of interest can be delayed from decoding in order to allow a given entry in said BTB table to be detected in time for future decoding of said branch of interest.

16. The system of claim 12 wherein said recent entry queue is fully associative for reading.

17. A program product comprising a computer usable medium having computer readable code thereon for controlling and configuring a computer, having a pipelined processor and a Branch Target Buffer (BTB) table, to:
create a recent entry queue; said recent entry queue comprising a set of BTB table entries logically positioned in parallel with said BTB table;
organizing said recent entry queue as a FIFO queue wherein when a previously presented entry is placed into said recent entry queue, an oldest entry therein is moved out to make room for said previously presented entry;
organizing said BTB table into a plurality of associative classes and said recent entry queue being associative;
defining said recent entry queue being logically defined as a subset of said BTB table and coupled to track a last number of branches entered into said BTB table;
comparing each previously presented entry to most recent entries into said recent entry queue;
blocking duplicate entries from being installed into said BTB table and said recent entry queue by examining contents of said recent entry queue for such duplicate entries prior to a write into said BTB table and said recent entry queue and in addition allowing a decode to be delayed by a defined number of cycles such that a branch of interest can be delayed from decoding in order to allow a given entry in said BTB table to be detected in time for future decoding of said branch of interest.

18. The program product of claim 17 comprising code for making said recent entry queue fully associative for reading.

19. The program product of claim 17 comprising code for using a subset of the recent entry queue as a subset of the BTB and comprising code for fast indexing recently encountered branches.

20. The program product of claim 17 comprising code for using a subset of the recent entry queue as a subset of the BTB and comprising code for searching a complete recent entry queue to block duplicate BTB table writes.

21. The program product of claim 17 comprising code for staging writes to said BTB table in said recent entry queue.

22. The program product of claim 21 comprising code for delaying a write and placing said write in said recent event queue.

23. The program product of claim 22 comprising code for detecting a predicted branch while a BTB write thereof is temporarily staged in the recent entry queue.

24. The program product of claim 17 further comprising code for organizing said recent entry queue as a FIFO queue.

25. The program product of claim 17 further comprising code for writing an entry into said recent entry queue when an entry is written into said BTB table.

26. The program product of claim 17 comprising code for creating hit detect logic to support associativity of said BTB table.

27. The program product of claim 17 comprising code for using a subset of said recent entry queue as a subset of said BTB table.

28. The program product of claim 17 comprising code for delaying decoding until after a fixed number of cycles.

29. The program product of claim 28 comprising code for delaying decoding until said BTB table predicts a branch.

30. The program product of claim 28 comprising code for delaying decoding until said BTB table predicts a branch.

* * * * *